United States Patent [19]
Zoccole

[11] Patent Number: 5,993,925
[45] Date of Patent: Nov. 30, 1999

[54] PROTECTIVE WINDOWS FOR ORNAMENTAL WINDOWS

[76] Inventor: Patrick M. Zoccole, 1127 Main St., Sharpsville, Pa. 16150

[21] Appl. No.: 09/237,186

[22] Filed: Jan. 25, 1999

[51] Int. Cl.[6] .................................................. B44F 1/06
[52] U.S. Cl. ................................................ 428/38; 428/13
[58] Field of Search ........................................ 428/13, 38

[56] References Cited

U.S. PATENT DOCUMENTS

| | | | |
|---|---|---|---|
| 4,619,850 | 10/1986 | Charlton | 428/38 |
| 5,134,004 | 7/1992 | Moline | 428/38 |
| 5,884,441 | 3/1999 | Monroe, Jr. et al. | 428/38 X |

*Primary Examiner*—Archene Turner
*Attorney, Agent, or Firm*—David V. Radack; David W. Brownlee; Eckert Seamans Cherin & Mellott, LLC

[57] ABSTRACT

Protective window for an ornamental window in which the protective window has an outer frame, protective glazing and optionally mullions that protect the ornamental window while maintaining its beauty. The protective window has extension jambs on the frame that hide the structural portions of the building wall and any mullions in the ornamental window so the two windows have an attractive appearance undiminished by the sight of the edges of the building wall or undersides of the mullions between the two windows.

20 Claims, 4 Drawing Sheets

PROTECTIVE WINDOWS FOR ORNAMENTAL WINDOWS

BACKGROUND OF THE INVENTION

This invention relates to systems for protecting ornamental windows, and in particular to a protective window having protective glazing in a frame that overlies and conceals the structural support for the ornamental window so as to preserve the ornamental appearance thereof.

Many ornamental windows, such as stained glass windows, are quite expensive and may have values in the many thousands or hundreds of thousands of dollars. The location of such windows in the exterior walls of buildings exposes the windows to damage by a variety of causes such as vandalism, wind-blown objects and weathering. Repair of damaged ornamental windows is also extremely expensive, especially if the windows must be removed to be repaired.

The need to protect ornamental windows has been long standing. But, ornamental windows are typically large and difficult to protect without substantially detracting from their beauty. Efforts to provide protection for ornamental windows have generally resulted in loss of the aesthetics of the windows and have been unsatisfactory.

An improved system is needed for protecting ornamental windows without significantly detracting from the beauty of the windows. A system is needed that can be used to protect large ornamental windows that may have one or more structural mullions between the glazing sections. An improved protective window is needed for ornamental windows which does not detract from the aesthetic appearance of the ornamental window from either the inside or outside of the building in which the ornamental window is mounted.

SUMMARY OF THE INVENTION

This invention satisfies the above-described needs for protection for ornamental windows. The invention provides a protective window having protective glazing in it and a frame construction which does not significantly detract from the pleasing appearance of the ornamental window. The frame of the protective window, including any mullions in the frame, correspond in outline to the outer edges of the ornamental window and have extension jambs that substantially conceal the supporting structure in the wall around the ornamental window, and also blend in with any supporting mullions in the ornamental window. The frame of the ornamental window is preferably made of aluminum extrusions that are welded together to form a solid unit, and the protective glazing is preferably laminated glass that has a high impact resistance.

Accordingly, a primary object of this invention is to provide a protective window for an ornamental window which will not significantly detract from the beauty of an ornamental window.

Another object of this invention is to provide a system and method for protecting ornamental windows.

The above and other objects and advantages of this invention will be more fully understood and appreciated with reference to the following description when read in conjunction with the attached drawings.

DESCRIPTION OF THE PREFERRED EMBODIMENTS

Figure 1:
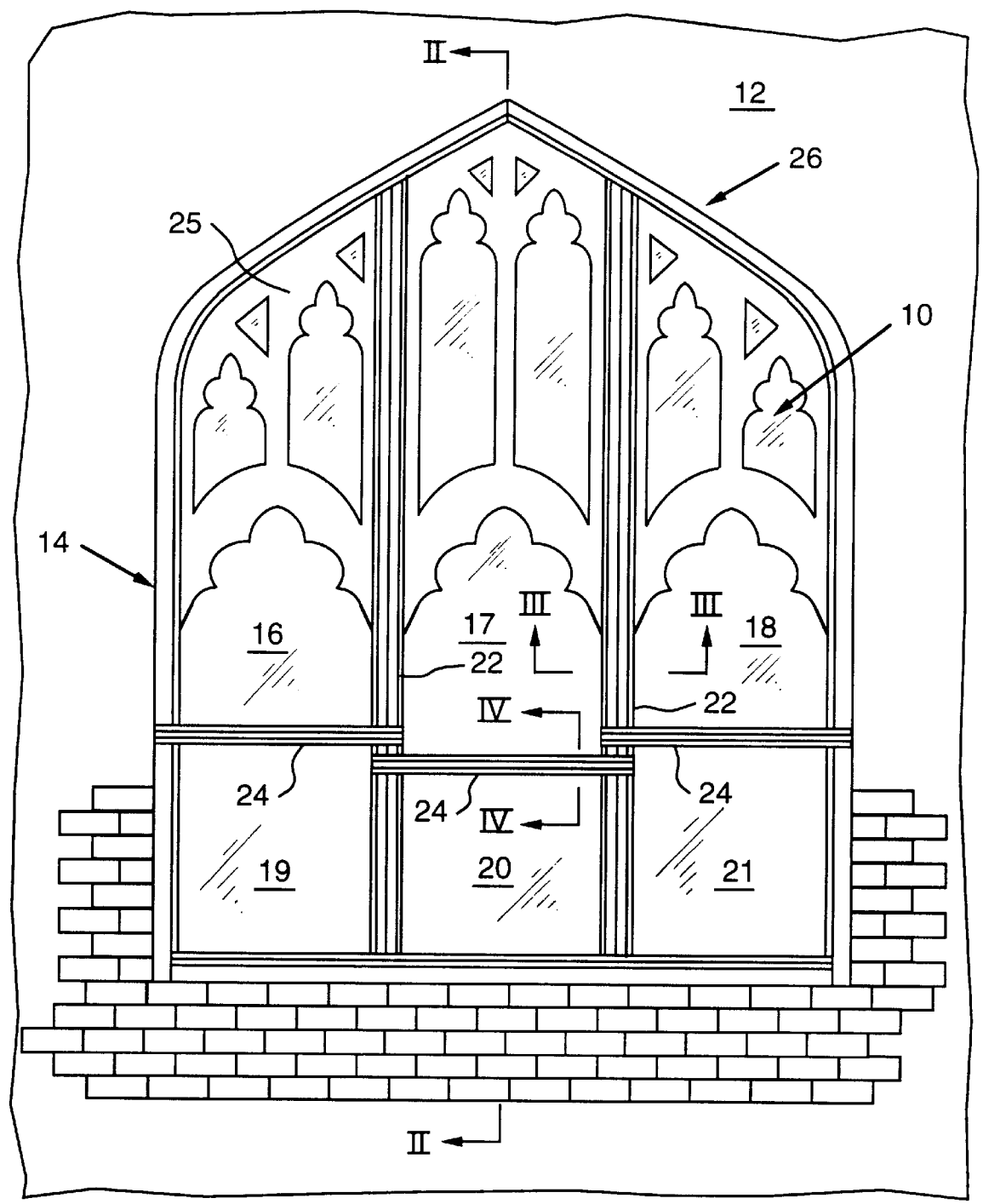
FIG. 1 is a front elevational view of a protective window of this invention covering an ornamental window in a building wall.
Figure 2:
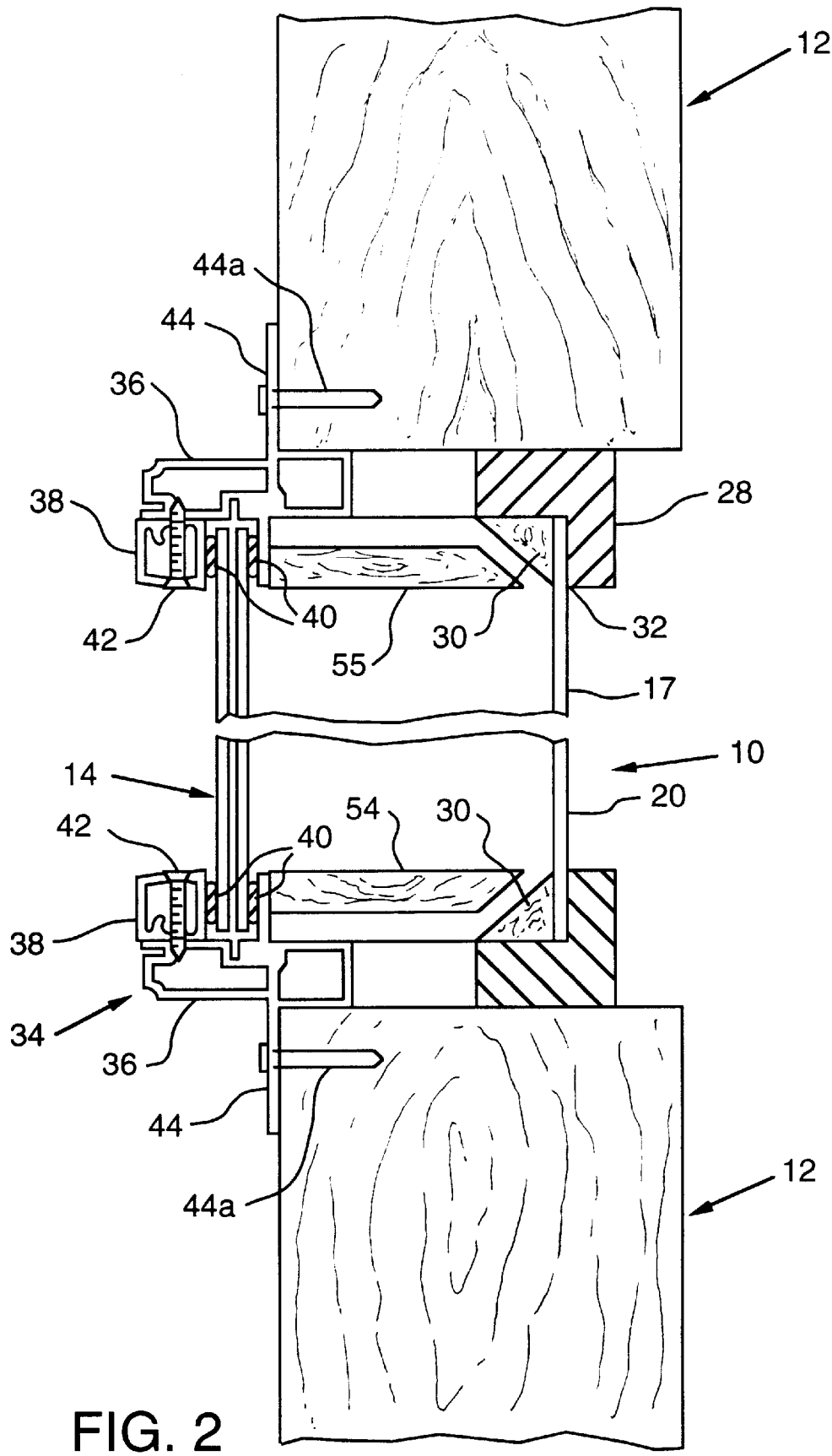
FIG. 2 is a vertical cross-sectional view through the protective and ornamental windows of FIG. 1 taken along line II—II in that Figure.

FIG. 1 shows a typical ornamental window 10 in a building wall 12, which may have a protective window 14 of this invention secured over the ornamental window 10 to protect it. FIG. 1 is a view from the exterior side of the building wall, and FIG. 2 is a vertical cross-sectional view through the windows 10, 14 showing the protective window 14 on the exterior side of windows 10. In accordance with this invention, protective window 14 blends in with the ornamental window 10 and does not detract from its beauty.

The ornamental window 10 may have multiple glazing sections 16, 17, 18, 19, 20, 21 in it with structural mullions 22, 24 between the glazing sections. The window 10 may have ornamental grill work 25 in it, and/or may have stained glass, not shown, in some or all of the glazing sections. The window 10 may have an arch shaped upper portion 26 or other contours or outlines for ornamental purposes.

Many ornamental windows, such as window 10, may be quite large. Window 10, for example, may be approximately 117 inches wide by 160 inches high. The window 10 is in an exterior wall and would therefore be vulnerable to damage by a variety of causes, if left unprotected. It is a feature of this invention that protective window 14 protects ornamental window 10 without significantly detracting from the beauty of the ornamental window.

As best seen in FIG. 2, the ornamental window 10 has an outer frame in which the glazing sections 16–21 are secured. The horizontal mullions in the windows 10, 14 are not shown in FIG. 2, but instead are removed from that figure and shown in FIG. 4 in order to show the cross-sections in a large scale. The outer frame 28 may be made of metal or other materials, and the glazing sections are secured in the frame by strips or beads 30 along the peripheral edges of the glazing sections. The ornamental window has an outer peripheral edge 32 that defines that portion of the window that is visible to the eye for ornamental purposes.

Figure 3:
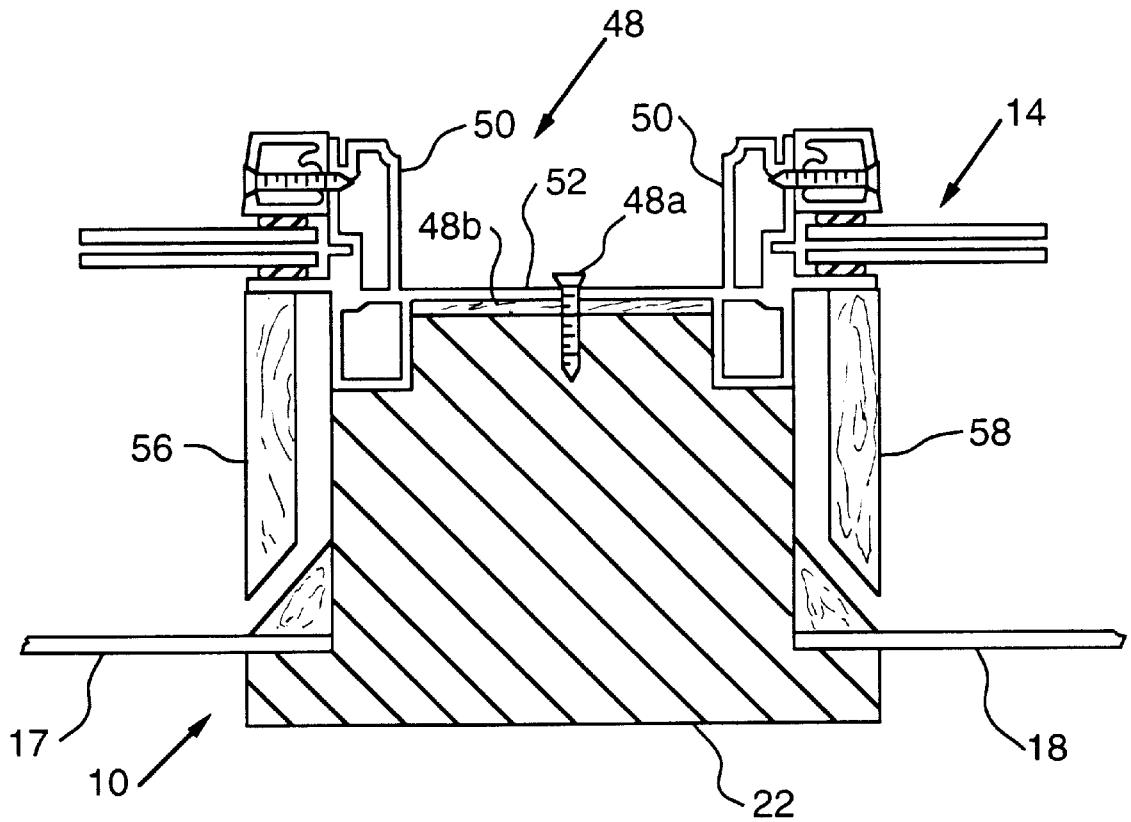
FIG. 3 is a cross-sectional view through a mullion in the protective and ornamental windows of FIG. 1 taken along line III—III in that Figure.
Figure 4:
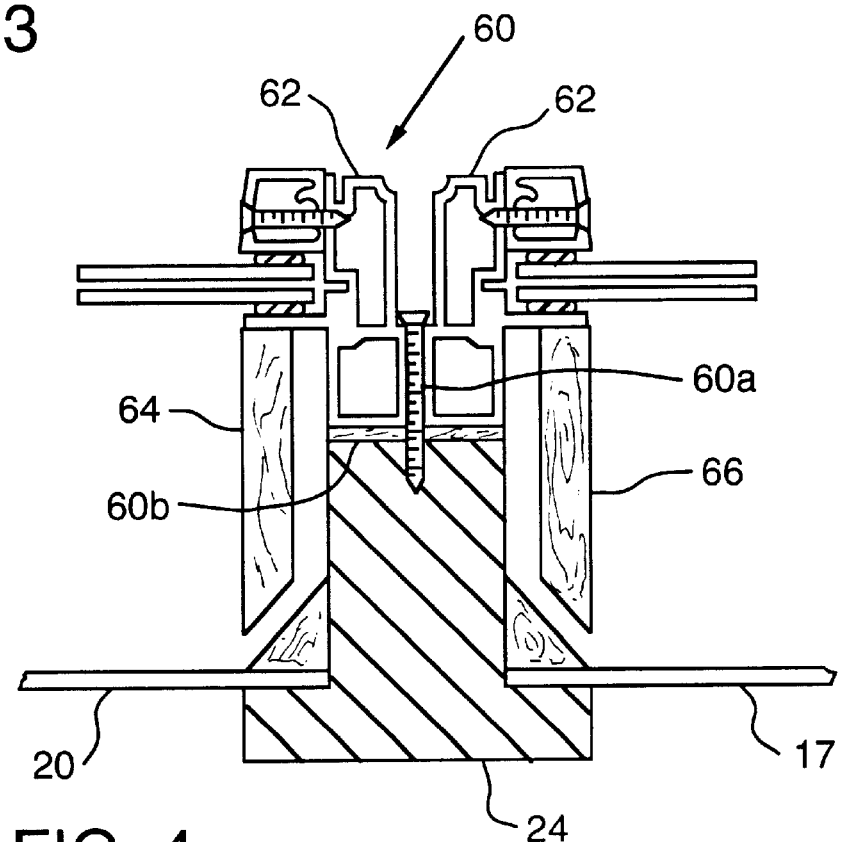
FIG. 4 is a cross-sectional view through another mullion for a protective window of this invention on an ornamental window of FIG. 1 taken along line IV—IV in that Figure.

FIGS. 3 and 4 are similar to FIG. 2 except that they are cross-sections through the mullions 22, 24 instead of the jam and sill of the windows. The mullions 22, 24 in the ornamental window may be of a variety of constructions and materials and are not part of this invention. Similar mullions may be found in many large ornamental windows to structurally support the glazing sections in the windows.

Referring to FIG. 2, the protective window 14 has an outer frame 34 which is preferably made of aluminum extrusions 36 that are welded together at the corners of the window and at the peak of the arch 26. It will be appreciated that the framing members can be made of any desirable architectural material such as, for example, wood, vinyl, steel, composites or combinations of the above. Aluminum extrusions 38 hold the glazing sections in the protective window 14 and seal the joints between the sections. Glazing tape 40 on both sides of the glazing seals the glazing between the extrusions 36, 38, and screws 42 may be used to secure extrusions 38 to extrusions 36. Each extrusion 36 preferably includes a nailing flange 44 that receives a masonry nail 44a for securing the protective window 14 to the building wall 12 on the exterior side of the ornamental window 10. The nailing flange 44 can have varying widths and can include a variety of ornamental moldings which can enhance the aesthetic appearance of the ornamental window 10.

The glazing sections 16–22 in the protective window 14 preferably are made of clear laminated glass. The glazing sections can also be thermopane, bulletproof and/or tinted. The laminated glass may, for example, include two sheets of ⅛ inch glass laminated together with 0.060 inch resin. Alternatively, the glazing sections may comprise sheets of transparent thermoplastic material. The glazing sections are desirably made from high impact resistance materials that will shield the ornamental window against damage by thrown or blown objects.

FIG. 3 shows vertical mullions 22, 48 in the ornamental and protective windows 10 and 14. The mullion 48 in the protective window 14 is sized, shaped and located to substantially cover the mullion 22 of the ornamental window 10. The mullion 48 may be made of two aluminum extrusions 50, which are welded or otherwise joined through a strip of aluminum 52. The mullion 48 is secured to mullion 22 by means of a screw 48a. It is also preferable to provide a shim 48b between the mullion 48 and the mullion 22. The shim 48b is preferably made of rubber. The shim 48b is used to align the protective window 14 with the ornamental window 10. The extrusions 50 may have the identical profile as extrusions 36 in the outer frame (FIG. 2) to reduce the inventory of extrusions required and thus the cost of the window. The width of the mullion 48 can be easily changed from mullion to mullion by changing the spacing between the extrusions 50 as welded to strip 52. A decorative molding can also be secured to the extrusion 48. The laminated glass in the protective window 14 may be secured in the extrusions in the same manner as described above respecting the outer frame of the protective window.

FIG. 4 shows the horizontal mullions 24, 60 in the ornamental and protective windows 10, 14. These mullions are similar to the vertical mullions shown in FIG. 3, except being narrower. The mullion 60 is secured to mullion 24 by means of a screw 60a. As with extrusion 48, a shim 60b is provided between the mullion 24 and the extrusion 60. The mullion 60 in the protective window is preferably made from two aluminum extrusions 62 which are welded or otherwise joined together, and the glazing sections in the protective window are secured in the mullions in the same manner as described above respecting the outer frame of the protective window.

An important feature of this invention is that the edge of the building wall 12 and any structural mullions in the ornamental window are substantially hidden from view from both the inside and outside of the building wall. The protective window and ornamental window look like a single unit with a protective glazing over the ornamental glazing. The structural mullions in the ornamental window are substantially not visible from the outside of the building, the undersides of the support mullions in the protective window are substantially not visible from the inside of the building, and the marginal edges of the building wall between the protective and ornamental windows are substantially not visible from either the inside or outside of the building.

In accordance with this invention, the outer edges of the glazing in the protective window are substantially aligned with the outer edges of the ornamental window, the edges of the mullions in the two windows are substantially aligned, and extension jambs are provided between the windows to give the appearance of a single unit that preserves the beauty of the ornamental window. FIG. 2 shows the extension jambs 54, 55 between the outer frames of the two windows, FIG. 3 shows extension jambs 56, 58 between the mullions in the windows, and FIG. 4 shows extension jambs 64, 66 between the mullions in the windows. The extension jambs are all located at the outer edges of the ornamental window 10 around the perimeter of the windows and the full lengths of the mullions so as to substantially conceal/hide the structural elements in the building wall and mullions between the two windows, while not covering or masking the ornamental window.

The extension jambs may be made from wood and have sheet metal facings, not shown, on them which have the same finish as the extrusions in the frame and mullions in the protective window. The extension jambs can also be made of aluminum, steel, vinyl, composites or combinations thereof. The extension jambs may be secured in the protective frame with adhesive and/or screws, not shown, or may be integral with the frame, and are dimensioned to extend interiorly toward the ornamental window 10 to preferably close proximity but not in contact with the outer frame of the ornamental window as can be seen in FIGS. 2–4. Preferably, a space of at least ⅛ of an inch should be left between the extension jamb and the ornamental window glazing for purposes of allowing expansion and contraction of the frames relative to each other to prevent the extension jambs from putting pressure on the glazing of the ornamental window. Furthermore, preferably, the extension jambs are also spaced from the sides of the mullions, as can be seen in FIGS. 3–4. This will ease installation of the protective windows, giving the installer some room to fit the framing of the protective window over the mullions.

Figure 5:
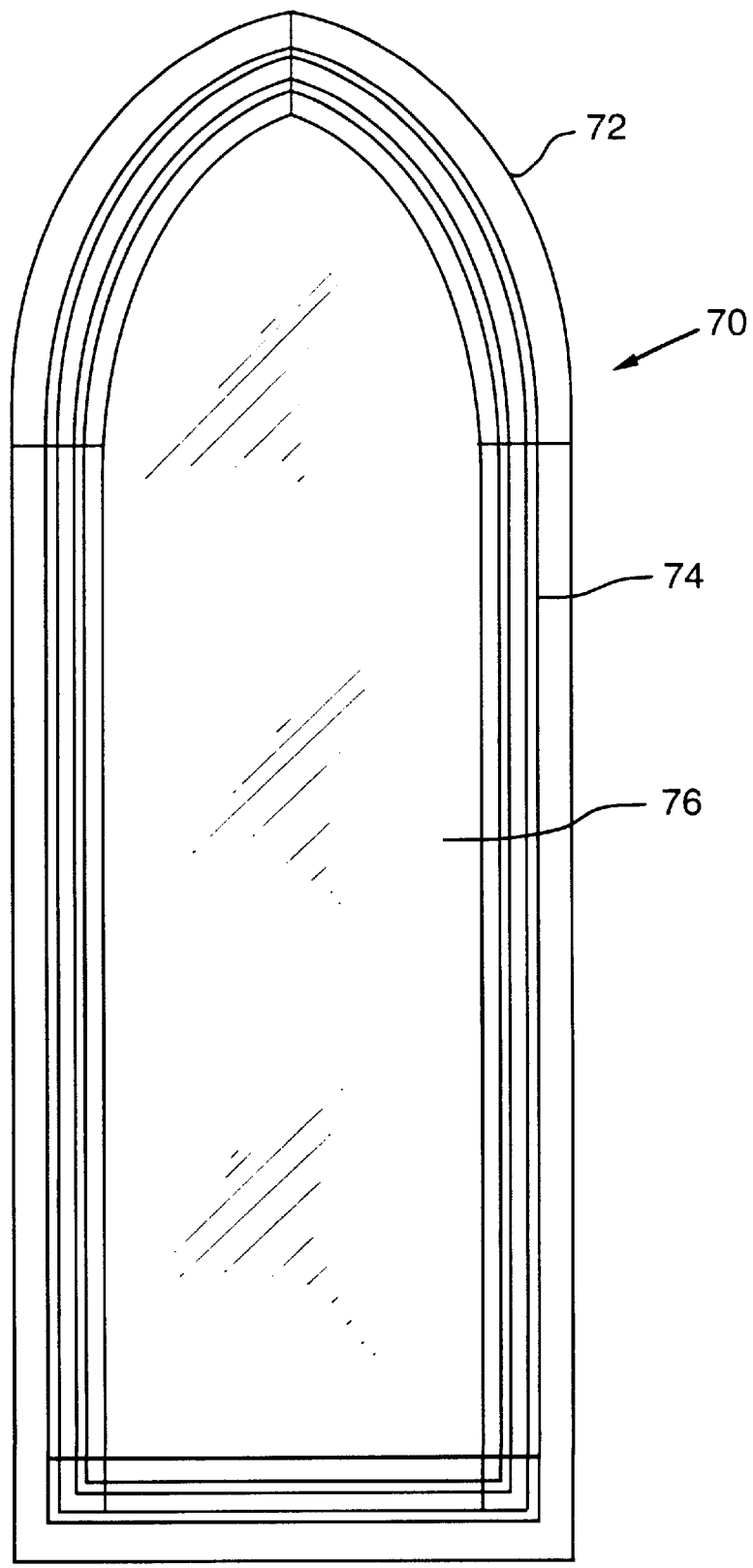
FIG. 5 is a front elevational view of an alternative protective window of this invention.

FIG. 5 shows an alternative embodiment of a protective window 70 of this invention. The window 70 may be about 21 inches wide by 69 inches high and has an arch shaped top portion 72. The window 70 mirrors the size and shape of an ornamental window, not shown, over which the protective window is to be secured. The protective window 70 of FIG. 5 includes no mullions because the ornamental window to be protected has no mullions.

The frame 74 of the window 70 is preferably made of aluminum extrusions and has an extension jamb like that shown in FIG. 2 around the entire perimeter of the frame. The glazing 76 in window 70 may be laminated glass or transparent thermoplastic material similar to window 14, and the window 70 may be secured over an ornamental window by securing nailing flanges to the surrounding building wall as with the window 14.

In order to resist condensation on the protective window, weep holes (not shown) can be drilled into the frame.

It is therefore seen that this invention provides a protective window and a method for protecting an ornamental window, which greatly reduces the risk of damage to an expensive ornamental window, while preserving the original aesthetic appearance and beauty of the window. It is preferred that before installing the protective window that the frame of the ornamental window, if wood, be scraped, primed and painted. Once the protective window is installed, the wood frame will not be subject to the elements, and thus will not need to be painted for many years. This is another advantage of the protective window of the invention. Additionally, the protective window becomes structurally a part of the original window, thus reinforcing the structural integrity of the original window, which may itself be old and in need of reinforcement. The protective window will act as an insulator, greatly reducing heating and air conditioning costs.

It will be apparent to those knowledgeable in the field of windows that various modifications may be made to the preferred embodiments selected for illustration without departing from the spirit of the invention or the scope of the claims appended hereto.

What is claimed is:

1. A protective window for an ornamental window in a building wall, said ornamental window having multiple glazing sections in it, at least one structural mullion between said glazing sections, and an outer peripheral edge defining said ornamental window, said protective window comprising:
    an outer peripheral frame, said outer frame having an inner peripheral edge substantially corresponding in outline to said outer edge of said ornamental window and an outer attachment flange for securing said protective window to said building wall overlying said ornamental window;
    at least one support mullion substantially covering said structural mullion in the ornamental window; and
    protective glazing for overlying said ornamental window to reduce the risk of damage to the ornamental window without significantly detracting from its appearance.

2. A protective window as set forth in claim 1 which includes extension jambs on said outer peripheral frame and support mullion, which substantially conceal them from view through said protective window.

3. A protective window as set forth in claim 2 in which said extension jambs extend to within close proximity of said building wall and said glazing section of said ornamental window in order to allow relative expansion without allowing said extension jambs to contact said building wall and said glazing section.

4. A protective window as set forth in claim 1 in which said outer peripheral frame is made of metal extrusions.

5. A protective window as set forth in claim 2 in which said at least two supporting mullions extend vertically in the window.

6. A protective window as set forth in claim 4 in which said metal extrusions are welded together.

7. A protective window as set forth in claim 1 including a shim disposed between said support mullion and said structural mullion.

8. A protective window as set forth in claim 1 in which said protective glazing comprises laminated glass.

9. A protective window as set forth in claim 8 in which said laminated glass includes two layers of glass bonded together with resin.

10. A protective window as set forth in claim 1 in which said protective glazing is made of a transparent thermoplastic material.

11. A protective outer window for a stained glass window in a building wall, said stained glass window having an outer peripheral edge and a plurality of structural mullions in the window, said protective window comprising:
    an outer peripheral frame having an inner peripheral edge substantially corresponding to said outer edge of said stained glass window and an outer attachment flange for securing the protective window to said building wall overlying said stained glass window;
    a plurality of support mullions substantially covering said structural mullions in the stained glass window;
    said outer peripheral frame and support mullions having extension jambs secured thereto to substantially conceal the edge of said building wall and said structural mullion; and
    protective glazing secured in said peripheral frame and support mullions to protect the stained glass window without significantly detracting from its ornamental appearance.

12. A protective window as set forth in claim 11 which is at least 4 feet by 6 feet.

13. A protective window as set forth in claim 11 in which is at least about 4 feet wide and 8 feet high with two of said support mullions extending vertically in the window and said window having an arch-shaped top end.

14. A method for protecting an ornamental window in a building wall against damage, said ornamental window having a plurality of glazing sections in it with structural mullions separating the glazing sections and having an outer peripheral edge around the glazing sections, said method comprising:
    providing a protective window over said ornamental window, said protective window having an outer peripheral frame made of aluminum extrusions welded together, said frame having an inner peripheral edge substantially corresponding with said outer peripheral edge of said ornamental window and having an attachment flange for securing said protective window to said building wall with the protective window outwardly overlying said ornamental window, said protective window further having mullions substantially covering said structural mullions in said ornamental window, extension jambs on said outer peripheral frame and mullions extending toward said glazing sections to substantially conceal said building wall and said structural mullions from view through said protective window, and protective glazing to reduce the risk of damage to the ornamental window without significantly detracting from the appearance of the ornamental window; and
    securing the protective window to the building wall overlying said ornamental window.

15. A method as set forth in claim 14 in which said protective glazing comprises laminated glass.

16. A protective window for an ornamental window in a building wall, said ornamental window having an outer peripheral edge that includes at least one curvilinear portion, said protective window comprising:
    an outer peripheral frame to form a solid perimetric frame structure, said outer frame having an inner peripheral edge substantially corresponding in outline to said outer peripheral edge of said ornamental window including said curvilinear portion thereof, an extension jamb on said frame extending toward said building wall to substantially conceal the edge of the wall from view through said protective window, and having an attachment flange on said frame for securing said protective window to said building wall; and
    protective glazing for overlying said ornamental window to reduce risk of damage to the ornamental window without significantly detracting from its appearance.

17. A protective window as set forth in claim 16 for an ornamental window having multiple glazing sections in it and at least one structural mullion between said glazing sections, and said protective window having at least one support mullion substantially covering said structural mullion.

18. A protective window as set forth in claim 17 in which said support mullion has two spaced extension jambs for engaging against said structural mullion and hiding it from view.

19. A protective window as set forth in claim 16 in which said glazing comprises laminated glass.

20. A protective window as set forth in claim 18 in which said extension jambs comprise wood strips having metal facings on them to have the substantially the same appearance as said metal extrusions in said outer peripheral frame.

* * * * *